United States Patent [19]

Chen

[11] Patent Number: 5,678,836
[45] Date of Patent: Oct. 21, 1997

[54] VERTICAL TUBE STRUCTURE FOR BICYCLES

[76] Inventor: Chia-Lung Chen, 33-4, Pu Kang Road, Pu Yai Hsiang, Changhua, Taiwan

[21] Appl. No.: 562,094

[22] Filed: Nov. 22, 1995

[51] Int. Cl.$^6$ ................................................. B62K 21/04
[52] U.S. Cl. ................................................. 280/280; 280/276
[58] Field of Search ............................... 280/279, 280, 280/274, 276; 74/551.1, 551.2

[56] References Cited

U.S. PATENT DOCUMENTS

| | | | |
|---|---|---|---|
| 5,387,255 | 2/1995 | Chiang | 280/279 |
| 5,496,126 | 3/1996 | Lin | 280/279 |
| 5,553,511 | 9/1996 | Marui | 280/279 |

*Primary Examiner*—Brian L. Johnson
*Assistant Examiner*—Avraham Lerner
*Attorney, Agent, or Firm*—Beveridge, DeGrandi, Weilacher & Young LLP

[57] ABSTRACT

An improved vertical tube for bicycles includes a vertical tubular portion of a horizontal tube fitted onto a front fork having a bearing means fitted around its outer periphery such that the bottom of the tubular portion urges against a tapered inner ring of the bearing means, a baffle cap, and a torsion spring having a first end fitted into a small through hole of the baffle cap and a second through hole inserted into a tiny through hole of a stop rod. A bolt is inserted via a central hole of the baffle cap through the torsion spring into a central through hole of the stop rod to be locked with a nut before passing through a threaded hole of a pressing block which is caused to press against the lower inner wall of the stop rod. The pressing block as well as the stop rod and bolt are inserted into the front fork such that when the bolt is turned, the pressing block will cause a lower section of the stop rod to expand to urge against the inner wall of the front fork. The bolt may be turned loose to release the pressing block to permit repair or replacement of the horizontal tube.

1 Claim, 4 Drawing Sheets

VERTICAL TUBE STRUCTURE FOR BICYCLES

BACKGROUND OF THE INVENTION (a) Field of the Invention

The present invention relates to a vertical tube structure for a bicycle, and more particularly to an improved vertical tubular portion of a handlebar horizontal tube, which may be conveniently installed and dismantled.

(b) Description of the Prior Art

In the prior art, as shown in FIGS. 3 and 4, a vertical handlebar tube A' of a bicycle has a baffle cap A2 provided with an orifice A1 for insertion of a bolt B', and a front fork D extended from a head tube E of the bicycle has a bearing unit F fitted around its outer periphery to baffle the head tube E. The bearing unit F consists of a tapered inner ring F1 with a split F11 when the vertical tube A' is fitted onto the front fork D, a bottom edge of the vertical tube A' urges against the inner ring F1 of the bearing unit F. There is also provided a stop block G with a central threaded hole G2. The stop block G further has a couple of circular baffle pieces G1 disposed at the upper and lower ends thereof. Each baffle piece G1 tilts slightly upward and has a plurality of notches G11 spaced equally apart from each other. The stop block G is hammered into a hollow interior of the front fork D to a suitable depth by means of a set of special tools. The cap A2 is then fitted onto the vertical tube A' and the front fork D with the bolt 8 inserted into the front tube D to lock with the stop block G. The baffle pieces G1 of the stop block G may press tightly against the inner wall of the front fork D while the cap A2 may press against the vertical tube A' for securing purposes.

Since the stop block G is hammered into the front fork D by means of considerable force, care has to be taken in order that the stop block G is driven into the front fork D to a suitable depth and that the threaded hole G2 of the stop block G is not damaged; otherwise, the bolt B' cannot be screwably fit into the threaded hole G2. Additionally, the stop block G is comparatively more complicated and troublesome to manufacture, and the force provided thereby is not strong enough. Besides, once the stop block G is hammered into the front fork D, it is very difficult to remove it therefrom, greatly affecting future maintenance and repair work.

SUMMARY OF THE INVENTION

A primary object of the present invention is to provide an improved vertical tube structure for bicycles which may be firmly secured in place and which may be easily dismantled when a handlebar horizontal tube needs repair or replacement.

To achieve the above-mentioned object, the improved vertical tube structure according to the present invention comprises a bolt inserted through a through hole of a baffle cap into a vertical tubular portion of a handle bar horizontal tube, a front fork extending from a lower portion of a head tube, a bearing means fitted around the outer periphery of the front fork for checking the head tube, the bearing means including a tapered inner ring provided with a split such that when the tubular portion is fitted onto the front fork, a bottom portion thereof urges against the inner ring, a stop rod having a central through hole and an eccentrically disposed small through hole in an upper side thereof and a plurality of elongated notches spaced equally apart from each other at a lower section thereof, the baffle cap further having a small through hole disposed in a bottom side thereof at an eccentric position, and a torsion spring having a first end inserted into the small through hole of the baffle cap and a second end fitted into the small through hole of the stop rod, in which the bolt is inserted via the through hole of the baffle cap through the torsion spring into the central through hole of the stop rod to be locked with a nut fitted thereonto from the underside of the stop rod; the bolt is then driven into a threaded hole of a tapered pressing block which is caused to press against the lower inner wall of the stop rod such that the pressing block may fit into the front fork, whereby when the bolt is turned downwardly, the tapered pressing block will force the lower section of the stop rod with the notches to expand and urge against the inner wall of the front fork, and when the bolt is turned upwardly to release the pressing block, the horizontal tube may be disengaged to permit repair or replacement.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
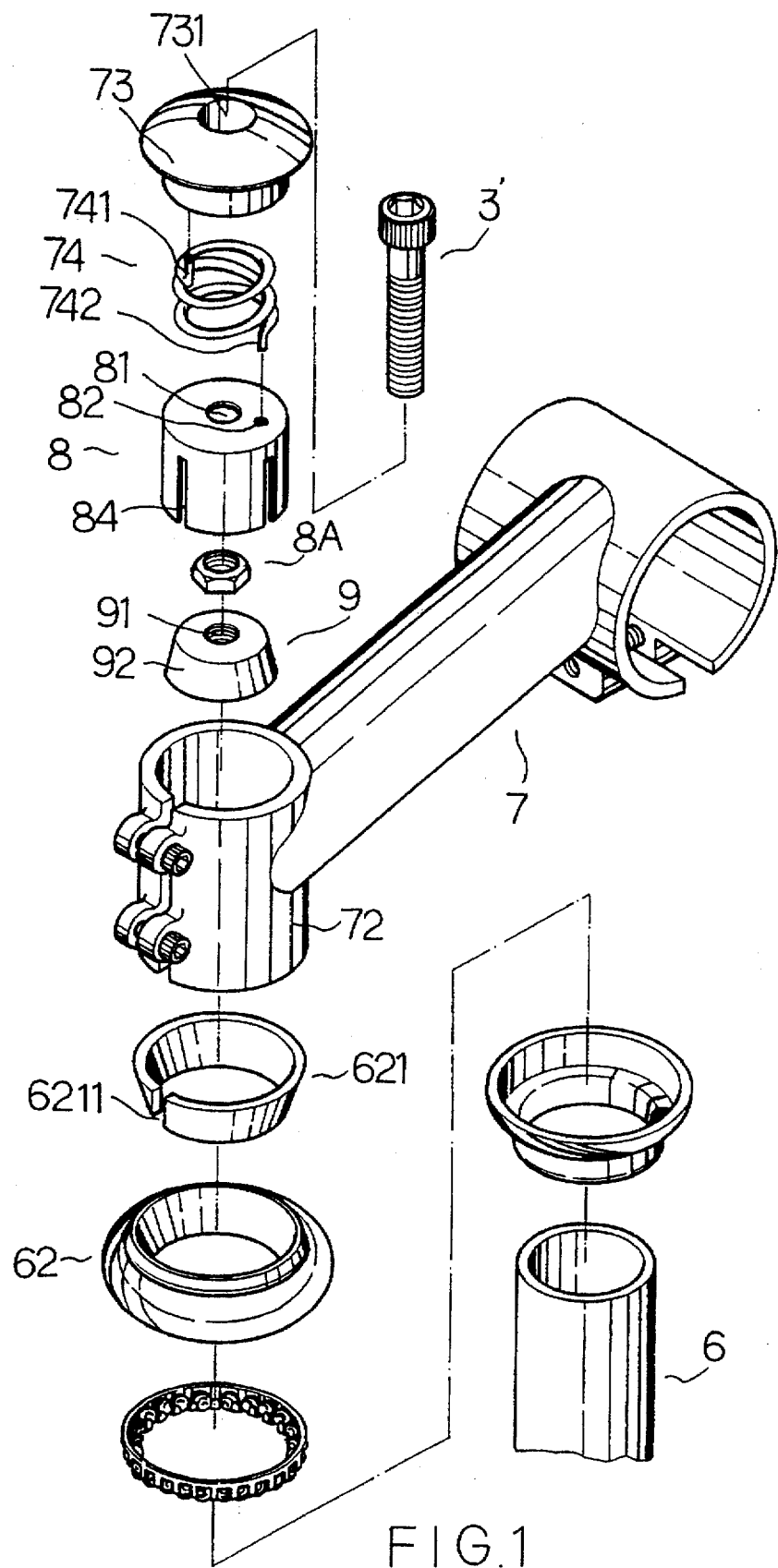
FIG. 1 is a perspective exploded view of the present invention.
Figure 2:
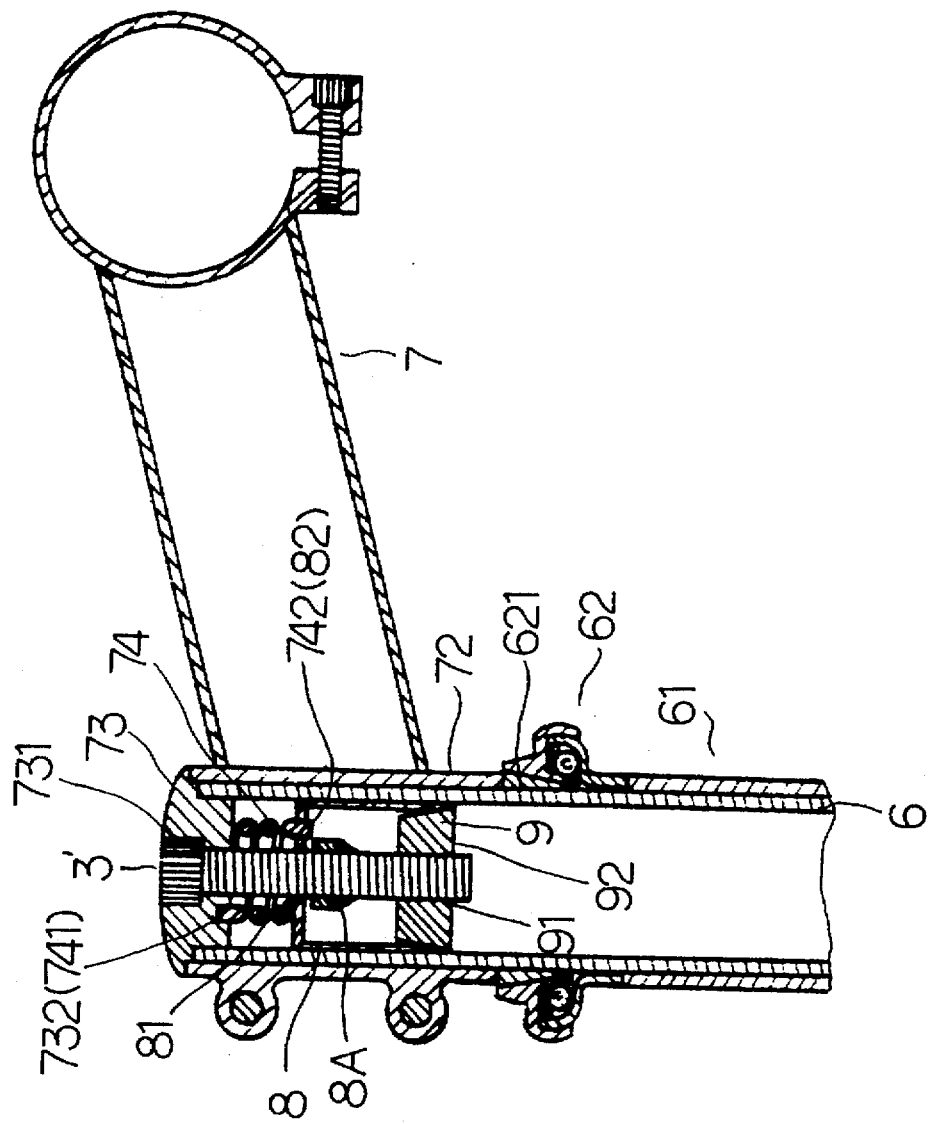
FIG. 2 is a sectional view of the present invention in an assembled state.
Figure 3:
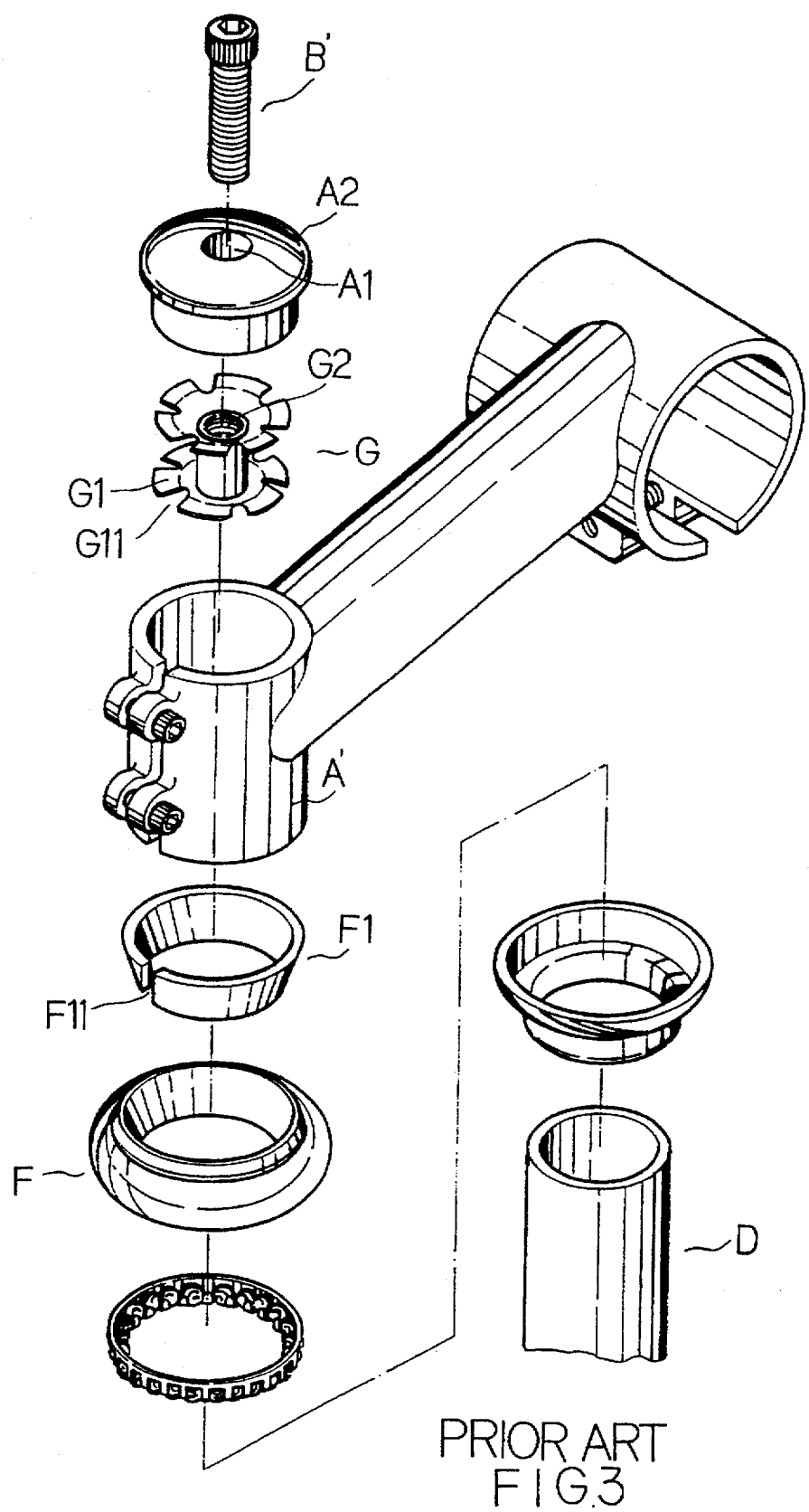
FIG. 3 is a perspective exploded view of the prior art.
Figure 4:
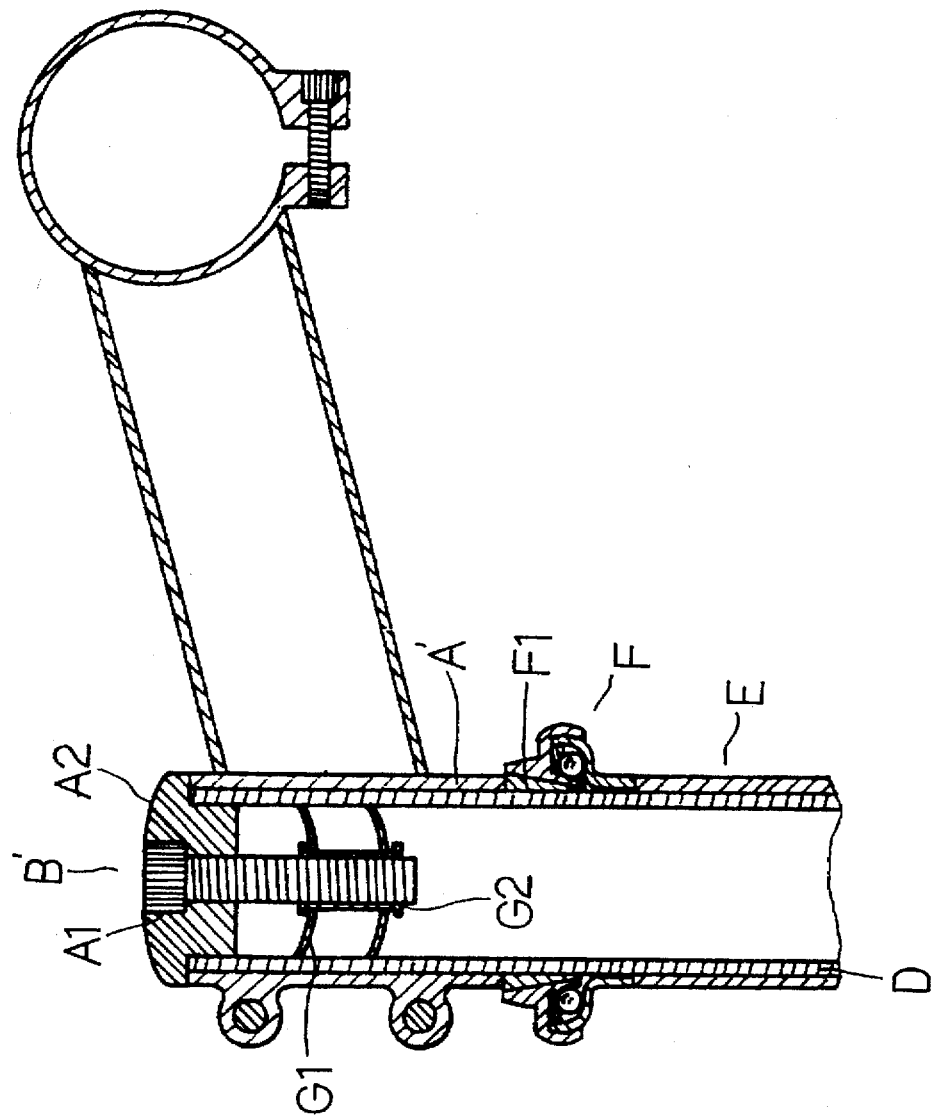
FIG. 4 is a sectional view of the prior art in an assembled state.

With reference to FIGS. 1 and 2, the present invention comprises a handlebar horizontal tube 7, a short bolt 3', a pressing block 9, a stop rod 8, a nut 8A, a front fork 6, a torsion spring 74, a head tube 61 and a bearing means 62. The horizontal tube 7 has a vertical tubular portion 72 having an opening. The bolt 3' may be inserted longitudinally into the tubular portion 72 via an orifice 731 of a baffle cap 73 fitted onto the tubular portion 72. The front fork 6 is extended from a lower portion of the head tube 61. The bearing means 62 is fitted around the outer periphery of the head tube 61 for baffling a front rim of the head tube 61. The bearing means 61 consists of a tapered inner ring 621 provided with a split 6211. When the tubular portion 72 is fitted onto the front fork 6, a bottom edge of the tubular portion 72 urges against an upper edge of the inner ring 621 of the bearing means 62. The stop rod 8 is provided with a central through hole 81 and an eccentrically disposed small through hole 82 in an upper side thereof. A lower section of an annular body of the stop rod 8 is provided with a plurality of elongated notches 84 of a suitable length spaced equally apart from each other. The baffle cap 73 is further provided with a small through hole 732 in a bottom side thereof at an eccentric position. The torsion spring 74 has a first end 741 inserted into the small through hole 732 in the bottom side of the baffle cap and a second end 742 fitted into the small through hole 82 of the stop rod 8, such that the bolt 3' may be driven through the through hole 731 of the baffle cap 73 past the torsion spring 74 into the central through hole 81 of the stop rod 8. The nut 8A may then be fitted from the underside of the stop rod 8 onto the bolt 3'. Adhesive is further applied to a suitable section of the bolt 3' to strengthen the connection. The pressing block 9 is provided with a central threaded hole 91 and has a tapered outer surface 92. The pressing block 9 is then screwably locked with a lower portion of the bolt 3' such that it presses against a lower inner wall of the stop rod 8. The pressing block 9 is then inserted into the front fork 6 and the baffle cap 73 is caused to urge against the upper rim of the tubular portion 72. By means of such an arrangement, when the bolt 3' is turned downwardly, the tapered surface 92 of the pressing block 9 will force the lower section of the stop rod 8 with the elongated notches 84 to expand and to press against the inner wall of the front fork 6, achieving a firm connection. And if repair or replacement of the handlebar horizontal tube is necessary, it is not necessary to turn the bolt 3' loose to release the pressing block 9.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved vertical tube structure for bicycles, comprising:

a handlebar horizontal tube having a vertical tubular portion fitted onto a front fork such that a bottom edge of said tubular portion urges against an upper edge of a tapered inner ring of a bearing means;

a front fork extending from a lower portion of a head tube;

a baffle cap having a central through hole for insertion of a bolt and a small through hole in a bottom side thereof at an eccentric position;

a stop rod having a central through hole and an eccentrically disposed small through hole in an upper side thereof, and a plurality of elongated notches spaced equally apart from each other at a lower section thereof;

a pressing block having a threaded hole and a tapered surface;

said bearing means fitted around an outer periphery of said front fork for baffling an upper edge of said head tube; said bearing means having said tapered inner ring provided with a split; and a torsion spring having a first end inserted into said small through hole of said baffle cap and a second end fitted into said small through hole of said stop rod; wherein said bolt is inserted via said central through hole of said baffle cap through said torsion spring into said central through hole of said stop rod to be locked with a nut fitted thereonto from an underside of said stop rod, an adhesive being applied to a suitable portion of said bolt to secure the connection; and said bolt is further driven into said threaded hole of said pressing block which is caused to urge against a lower inner wall of said stop rod, and said stop rod together with said bolt and said pressing block are inserted into said front fork with said baffle cap pressing against an upper rim of said tubular portion, whereby when said bolt is turned, said tapered surface of said bolt causes the lower section of said rod with said notches to expand and to urge against an inner wall of said front fork.

* * * * *